(12) United States Patent
Gong et al.

(10) Patent No.: US 7,758,937 B2
(45) Date of Patent: Jul. 20, 2010

(54) RUBBER COMPOSITION AND VULCANIZED RUBBER PRODUCT USING THE SAME

(75) Inventors: Peng Gong, Kanagawa (JP); Hideyuki Oishi, Kanagawa (JP); Akira Sato, Kanagawa (JP); Naoto Torii, Kanagawa (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 12/530,044

(22) PCT Filed: Feb. 25, 2008

(86) PCT No.: PCT/JP2008/053159

§ 371 (c)(1),
(2), (4) Date: Sep. 4, 2009

(87) PCT Pub. No.: WO2008/108198

PCT Pub. Date: Sep. 12, 2008

(65) Prior Publication Data

US 2010/0104787 A1    Apr. 29, 2010

(30) Foreign Application Priority Data

Mar. 7, 2007 (JP) ............... 2007-057524
Feb. 25, 2008 (JP) ............... 2008-530261

(51) Int. Cl.
 *C08L 9/02* (2006.01)
 *C08L 9/06* (2006.01)
 *C08K 3/04* (2006.01)
(52) U.S. Cl. .................. 428/36.8; 428/36.9; 428/36.91; 428/36.3; 138/123; 138/137; 138/143; 138/153; 138/174

(58) Field of Classification Search ............... 428/36.8, 428/36.9, 36.91, 36.3; 138/127, 143, 153, 138/174, DIG. 7
See application file for complete search history.

(56) References Cited

U.S. PATENT DOCUMENTS 4,013,817 A * 3/1977 Masuda et al. .............. 428/462

(Continued)

FOREIGN PATENT DOCUMENTS

JP       62-172043 A       7/1987

(Continued)

OTHER PUBLICATIONS

English Translation of JP 62-172043.*

*Primary Examiner*—Rena L Dye
*Assistant Examiner*—Michele Jacobson
(74) *Attorney, Agent, or Firm*—Carrier, Blackman & Associates P.C.; Joseph P. Carrier; William D. Blackman

(57) ABSTRACT

Disclosed is a rubber composition excellent in oil resistance and weather resistance, while having excellent adhesion to a brass. Also disclosed is a vulcanized rubber product using such a rubber composition. Specifically disclosed is a rubber composition containing a rubber component (A), an inorganic filler (B), a plasticizer (C) and a process oil (D). The rubber component (A) contains 30-60% by mass of an acrylonitrile-butadiene rubber, 20-40% by mass of an ethylene-propylene-nonconjugated diene rubber, and 20-50% by mass of a styrene-butadiene rubber. The inorganic filler (B) is contained in the composition in an amount of 5-100 parts by mass per 100 parts by mass of the rubber component (A), and the mass ratio between the plasticizer (C) and the process oil (D) is from 15/85 to 75/25. Also specifically disclosed is a vulcanized rubber product obtained by vulcanizing such a rubber composition.

5 Claims, 1 Drawing Sheet

U.S. PATENT DOCUMENTS

| | | | |
|---|---|---|---|
| 4,421,884 A * | 12/1983 | Oyama et al. | 524/209 |
| 4,599,370 A * | 7/1986 | Grossman et al. | 523/200 |
| 4,656,219 A * | 4/1987 | Oyama et al. | 524/481 |
| 4,822,654 A * | 4/1989 | Takemura et al. | 428/36.8 |
| 4,988,548 A * | 1/1991 | Takemura et al. | 428/36.8 |
| 5,093,426 A * | 3/1992 | Sakabe et al. | 525/223 |
| 5,123,988 A * | 6/1992 | Iwasa | 156/244.11 |
| 5,143,772 A | 9/1992 | Iwasa | |
| 5,447,749 A * | 9/1995 | Iwasa | 427/200 |
| 6,057,395 A * | 5/2000 | Nishimura | 524/433 |
| 6,399,200 B1 * | 6/2002 | Sugimoto et al. | 428/402 |

FOREIGN PATENT DOCUMENTS

| | | |
|---|---|---|
| JP | 3-240514 A | 10/1991 |
| JP | 2001-192505 A | 7/2001 |
| JP | 2005-188607 A | 7/2005 |
| JP | 2005-188608 A | 7/2005 |
| JP | 2005-291281 A | 10/2005 |
| JP | 2005-291282 A | 10/2005 |

* cited by examiner

RUBBER COMPOSITION AND VULCANIZED RUBBER PRODUCT USING THE SAME

TECHNICAL FIELD

The present invention relates to a rubber composition and a vulcanized rubber product using such rubber composition.

BACKGROUND ART

Oil resistance and weather resistance (in particular ozone resistance) are required for the outer layer rubber of hydraulic hoses and high-pressure hoses. These hoses very often have a brass-plated reinforced layer such as a brass-plated wire, so that the rubber composition applied to the outer layer rubber is also required to have adhesion to a metal such as brass during vulcanization.

Therefore, chloroprene rubber (CR)-based rubbers which are excellent in oil resistance, weather resistance and adhesion to metals during vulcanization have conventionally been used as the outer layer rubber of hydraulic hoses and high-pressure hoses.

However, in recent years, from the viewpoint of environmental control and in particular dioxin control, halogenated rubbers are used less frequently, whereas rubber mixtures of acrylonitrile-butadiene rubbers and olefin rubbers are being used for the material having oil resistance and weather resistance (see, for example, Patent Document 1).

Patent Document 1 describes a rubber composition comprising 20 to 80 wt % of an α,β-unsaturated nitrile-conjugated diene copolymer rubber, 18 to 60 wt % of an ethylene-α-olefin-nonconjugated diene copolymer rubber, and 2 to 20 wt % of an aromatic vinyl compound-conjugated diene copolymer rubber.

Patent Documents 2 to 5 describe that the adhesion to metals during vulcanization may be improved by the addition of a metal salt of an organic acid.

Patent Document 1: JP 62-172043 A
Patent Document 2: JP 2005-188607 A
Patent Document 3: JP 2005-188608 A
Patent Document 4: JP 2005-291281 A
Patent Document 5: JP 2005-291282 A

DISCLOSURE OF THE INVENTION

Problems to be Solved by the Invention

Although the rubber composition described in Patent Document 1 had excellent oil resistance and weather resistance, its adhesion to brass was not sufficient.

In addition, the rubber compositions described in Patent Documents 2 to 5 did not exhibit satisfactory oil resistance and weather resistance, although having adhesion to metals during vulcanization.

Accordingly, an object of the invention is to provide a rubber composition which is excellent in oil resistance and weather resistance and also adheres well to brass. Another object of the invention is to provide a vulcanized rubber product using such rubber composition.

Means for Solving the Problems

The inventors of the invention have found that a rubber composition including a rubber component (A), an inorganic filler (B), a plasticizer (C), and a process oil (D) wherein the rubber component (A) contains 30 to 60 wt % of an acrylonitrile-butadiene rubber, 20 to 40 wt % of an ethylene-propylene-nonconjugated diene rubber, and 20 to 50 wt % of a styrene-butadiene rubber, the content of the inorganic filler (B) is 5 to 100 parts by weight with respect to 100 parts by weight of the rubber component (A), and the weight ratio of the plasticizer (C) to the process oil (D) is 15/85 to 75/25, is excellent in oil resistance and weather resistance and also adheres well to brass, and the invention has been thus completed.

Specifically, the invention provides the following (1) to (10).

(1) A rubber composition including a rubber component (A), an inorganic filler (B), a plasticizer (C), and a process oil (D),
wherein the rubber component (A) contains 30 to 60 wt % of an acrylonitrile-butadiene rubber, 20 to 40 wt % of an ethylene-propylene-nonconjugated diene rubber, and 20 to 50 wt % of a styrene-butadiene rubber, the content of the inorganic filler (B) is 5 to 100 parts by weight with respect to 100 parts by weight of the rubber component (A), and
the weight ratio of the plasticizer (C) to the process oil (D) is 15/85 to 75/25.

(2) The rubber composition of (1) above, wherein the rubber component (A) contains 30 to 50 wt % of the acrylonitrile-butadiene rubber, 20 to 35 wt % of the ethylene-propylene-nonconjugated diene rubber, and 25 to 50 wt % of the styrene-butadiene rubber.

(3) The rubber composition of (1) or (2) above, wherein the inorganic filler (B) is clay.

(4) The rubber composition of any one of (1) to (3) above, further including carbon black.

(5) The rubber composition of any one of (1) to (4) above, wherein the rubber composition is a rubber composition for use in hoses.

(6) A vulcanized rubber product obtained by vulcanizing the rubber composition of any one of (1) to (5) above.

(7) The vulcanized rubber product of (6) above, including a rubber layer obtained by vulcanizing the rubber composition of any one of (1) to (5) above and a brass-plated reinforced layer adjoining to the rubber layer.

(8) The vulcanized rubber product of (6) or (7) above which is a hose.

(9) The vulcanized rubber product of (7) above which is a hydraulic hose or a high-pressure hose.

(10) A hose including an inner rubber layer, a brass-plated reinforced layer disposed so as to adjoin to a circumferential side of the inner rubber layer, and an outer rubber layer disposed so as to adjoin a circumferential side of the reinforced layer,
wherein at least the outer rubber layer is formed from the rubber composition of any one of (1) to (5) above.

Effects of the Invention

The rubber composition of the invention is excellent in oil resistance and weather resistance and also adheres well to brass. In cases where the content of the inorganic filler (B) is 5 to 50 parts by weight with respect to 100 parts by weight of the rubber component (A), the rubber composition of the invention also has excellent mechanical strength following vulcanization.

The vulcanized rubber product of the invention can suppress the generation of dioxin during waste disposal and has therefore little effect on the environment. The vulcanized rubber product also has excellent oil resistance and weather resistance. Even in the case of using a reinforced layer having a brass-plated surface, the vulcanized rubber product has excellent durability owing to the excellent adhesion between the rubber layers and the reinforced layer.

DESCRIPTION OF SYMBOLS

Figure 1:
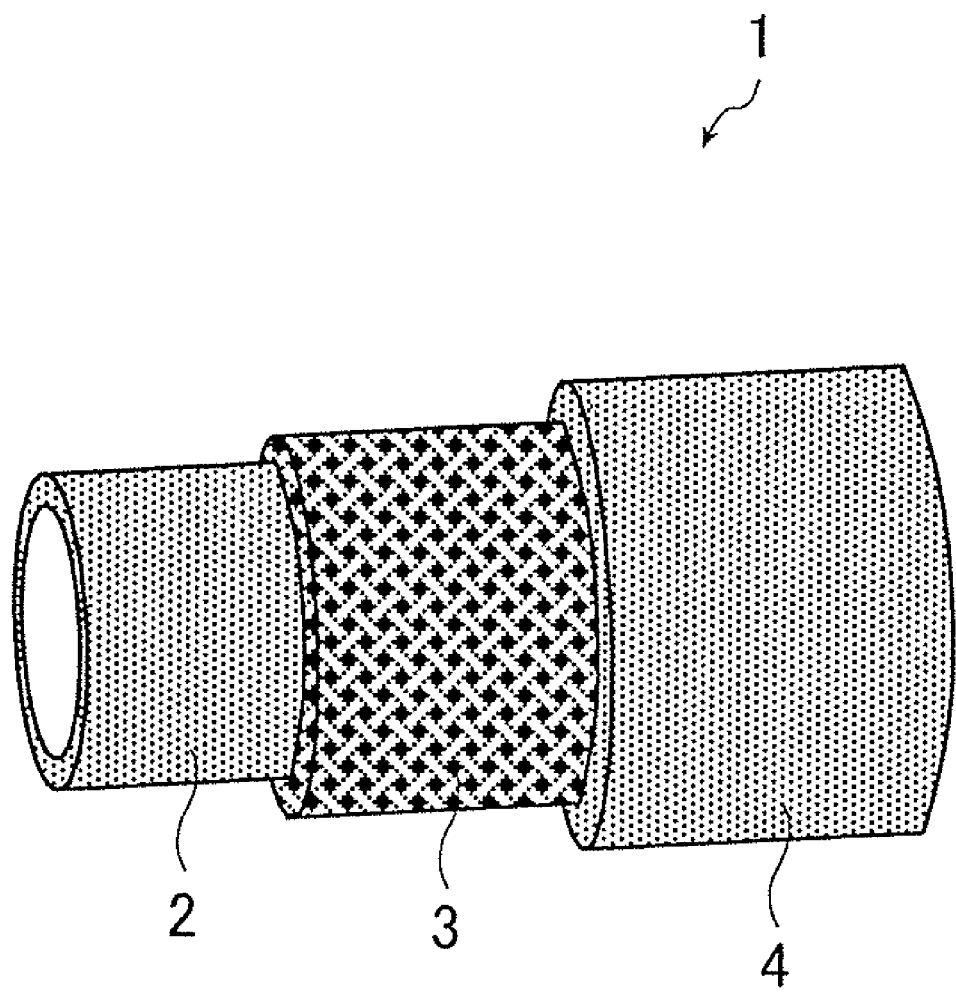
FIG. 1 is a perspective view showing an example of the hose of the invention.

1 Hose
2 Inner rubber layer
3 Reinforced layer
4 Outer rubber layer

BEST MODE FOR CARRYING OUT THE INVENTION

The invention is described more fully below.

The rubber composition of the invention is a rubber composition including a rubber component (A), an inorganic filler (B), a plasticizer (C), and a process oil (D) wherein the rubber component (A) contains 30 to 60 wt % of an acrylonitrile-butadiene rubber, 20 to 40 wt % of an ethylene-propylene-nonconjugated diene rubber, and 20 to 50 wt % of a styrene-butadiene rubber, the content of the inorganic filler (B) is 5 to 100 parts by weight with respect to 100 parts by weight of the rubber component (A), and the weight ratio of the plasticizer (C) to the process oil (D) is 15/85 to 75/25.

Rubber Component (A)

The rubber component (A) contains 30 to 60 wt % of the acrylonitrile-butadiene rubber, 20 to 40 wt % of the ethylene-propylene-nonconjugated diene rubber, and 20 to 50 wt % of the styrene-butadiene rubber.

The acrylonitrile-butadiene rubber (NBR) is a butadiene-acrylonitrile copolymer and general NBRs may be used without any particular limitation. In terms of the oil resistance and cold resistance, the average amount of nitrile bonds in the NBR is preferably 15 to 50 wt % and more preferably 20 to 45 wt %.

The NBR content in the rubber component (A) is 30 to 60 wt %. At an NBR content of less than 30 wt %, the oil resistance is poor, whereas at an NBR content in excess of 60 wt %, the weather resistance is poor.

The NBR content in the rubber component (A) is preferably 30 to 50 wt % and more preferably 35 to 45 wt % because the oil resistance and the weather resistance can be simultaneously achieved at a high level.

The ethylene-propylene-nonconjugated diene rubber (EPDM) is a terpolymer of ethylene, propylene and diene, and general EPDMs may be used without any particular limitation.

The EPDM content in the rubber component (A) is 20 to 40 wt %. At an EPDM content of less than 20 wt %, the weather resistance is poor, whereas at an EPDM content in excess of 40 wt %, the oil resistance is poor.

The EPDM content in the rubber component (A) is preferably 20 to 35 wt % and more preferably 25 to 35 wt % because the oil resistance and the weather resistance can be simultaneously achieved at a high level.

The styrene-butadiene rubber (SBR) is a styrene-butadiene copolymer and general SBRs may be used without any particular limitation.

The SBR content in the rubber component (A) is 20 to 50 wt %. At an SBR content of less than 20 wt %, the adhesion to brass during vulcanization is poor, whereas at an SBR content in excess of 50 wt %, the oil resistance and weather resistance are poor.

In terms of excellent oil resistance and weather resistance and higher adhesion to brass during vulcanization, the SBR content in the rubber component (A) is preferably 25 to 50 wt % and more preferably 25 to 35 wt %.

The rubber component (A) may contain other rubbers than the NBR, EPDM and SBR, as long as the effects of the invention are not impaired. Such rubbers are hereinafter referred to as "other rubbers".

Exemplary other rubbers include natural rubber (NR), epoxidized natural rubber (ENR), isoprene rubber (IR), acrylonitrile-isoprene rubber (NIR), butadiene rubber (BR), butyl rubber (IIR), hydrogenated nitrile rubber (HNBR), acrylic rubber (ACM), styrene-isoprene-butadiene rubber (SIBR), carboxylated butadiene rubber (XBR), carboxylated nitrile rubber (XNBR), carboxylated styrene butadiene rubber (XSBR), ethylene-vinyl acetate copolymer (EVM), ethyl acrylate-acrylonitrile copolymer (ANM), and ethyl acrylate-ethylene copolymer (AEM).

Such other rubbers may be preferably incorporated in the rubber component (A) in an amount of not more than 30 wt % and more preferably 0 wt %.

Inorganic Filler (B)

Any known inorganic fillers may be used for the inorganic filler (B) without particular limitation. The rubber composition of the invention containing a specific amount of the inorganic filler (B) has excellent adhesion to brass during vulcanization.

Examples of the inorganic filler (B) include clay, talc, calcium carbonate, activated calcium carbonate, magnesium carbonate, basic magnesium carbonate, finely-divided magnesium silicate, zinc carbonate, silica, mica, iron oxide, zinc oxide, titanium oxide, barium oxide, magnesium oxide, barium sulfate, calcium sulfate, and aluminum sulfate. Such inorganic fillers may be used singly or as combinations of two or more thereof. Carbon black is not included in the inorganic filler (B).

Of these, clay is preferred in terms of its excellent adhesion to brass during vulcanization and its excellent rubber tensile strength and wear resistance.

Examples of the clay include pyrophyllite clay, kaolin clay, sintered clay and silane-modified clay. These may be used singly or as combinations of two or more thereof.

Of these, kaolin clay is preferred in terms of its excellent rubber-reinforcing properties.

The content of the inorganic filler (B) is 5 to 100 parts by weight with respect to 100 parts by weight of the rubber component (A). At an inorganic filler (B) content of less than 5 parts by weight, the adhesion to brass during vulcanization is poor, whereas at an inorganic filler (B) content in excess of 100 parts by weight, the mechanical strength of vulcanized rubber is poor.

The content of the inorganic filler (B) is preferably 5 to 50 parts by weight and more preferably 10 to 25 parts by weight because the adhesion to brass during vulcanization and mechanical strength of vulcanized rubber are excellent.

Plasticizer (C)

Examples of the plasticizer (C) include, but are not limited to, phthalic acid derivatives such as dioctyl phthalate (DOP) and diisononyl phthalate (DINP); tetrahydrophthalic acid derivatives; adipic acid derivatives such as dioctyl adipate, adipic acid-propylene glycol polyester and adipic acid-butylene glycol polyester; succinic acid derivatives such as isodecyl succinate; azelaic acid derivatives; sebacic acid derivatives; trimellitic acid derivatives such as triisononyl trimellitate; dodecanoic-2-acid derivatives; maleic acid derivatives; fumaric acid derivatives; phosphoric acid derivatives such as tricresyl phosphate, tricresyl phosphate and trioctyl phosphate; pyromellitic acid derivatives; citric acid derivatives; oleic acid derivatives such as butyl oleate; ricinoleic acid derivatives such as methyl acetyl ricinoleate; stearic acid derivatives; sulfonic acid derivatives; glycol derivatives such as diethylene glycol dibenzoate; glycerol derivatives; glutaric acid derivatives; epoxy derivatives; polymerizable polyester plasticizers; polymerizable polyether plasticizers; and pentaerythritol esters. These may be used singly or as combinations of two or more thereof.

Of these, triisononyl trimellitate as a trimellitic acid derivative and tricresyl phosphate as a phosphoric acid derivative are preferred in terms of their excellent oil resistance and heat resistance.

The content of the plasticizer (C) is not particularly limited as long as the weight ratio of the plasticizer (C) to the process oil (D) to be described later is satisfied, and is preferably 2 to 75 parts by weight, more preferably 5 to 50 parts by weight and even more preferably 10 to 30 parts by weight with respect to 100 parts by weight of the rubber component (A). At a plasticizer (C) content within the above-defined range, the rubber characteristics such as mechanical strength of vulcanized rubber, heat resistance and rubber extrudability are excellent.

Process Oil (D)

Any known process oils may be used for the process oil (D) without particular limitation.

Examples of the process oil (D) include mineral oils such as aromatic oil, paraffin oil and naphthenic oil; and vegetable oils such as castor oil, palm oil and epoxidized palm oil.

The content of the process oil (D) is not particularly limited as long as the weight ratio of the plasticizer (C) to the process oil (D) to be described later is satisfied, and is preferably 2 to 75 parts by weight, more preferably 5 to 50 parts by weight and even more preferably 10 to 30 parts by weight with respect to 100 parts by weight of the rubber component (A). At a process oil (D) content within the above-defined range, the mechanical strength of vulcanized rubber, heat resistance and rubber extrudability are excellent.

The weight ratio of the plasticizer (C) to the process oil (D) in the rubber composition of the invention (plasticizer (C)/process oil (D)) is 15/85 to 75/25, preferably 30/70 to 70/30 and more preferably 40/60 to 60/40. At a weight ratio within the above-defined range, the adhesion to brass during vulcanization and mechanical strength of vulcanized rubber are excellent.

The rubber composition of the invention further contains a vulcanizing agent.

Examples of the vulcanizing agent include sulfur such as powdered sulfur, precipitated sulfur, highly dispersible sulfur, surface-treated sulfur and insoluble sulfur; and sulfur-containing organic compounds such as dimorpholine disulfide and alkylphenol disulfide.

The content of the vulcanizing agent is preferably 0.1 to 5.0 parts by weight and more preferably 1.0 to 3.0 parts by weight with respect to 100 parts by weight of the rubber component (A).

The rubber composition of the invention further contains a vulcanization accelerator.

Examples of the vulcanization accelerator include aldehyde-ammonia vulcanization accelerators, aldehyde-amine vulcanization accelerators, thiourea vulcanization accelerators, guanidine vulcanization accelerators, thiazole vulcanization accelerators, sulfenamide vulcanization accelerators, dithiocarbamate vulcanization accelerators, and xanthate vulcanization accelerators. These may be used singly or as combinations of two or more thereof.

Of these, sulfenamide vulcanization accelerators are preferred because the covulcanization properties of the rubber component (A) are good and the rubber mechanical strength is excellent.

Examples of the sulfenamide vulcanization accelerators include slow-acting, sulfenamide accelerators such as N-cyclohexyl-2-benzothiazole sulfenamide, N-t-butyl 2-benzothiazole sulfenamide, N,N-diisopropyl-1-2-benzothiazole sulfenamide, N,N-dicyclohexyl-2-benzothiazyl sulfenamide, N,N-diisopropyl-2-benzothiazole sulfenamide, and N,N-diisopropyl-2-benzothiazole sulfenamide.

The content of the vulcanization accelerator is preferably 0.1 to 5.0 parts by weight and more preferably 1.0 to 3.0 parts by weight with respect to 100 parts by weight of the rubber component (A).

The rubber composition of the invention preferably further contains carbon black. The rubber composition of the invention including carbon black is excellent in rubber characteristics such as rubber tensile strength and wear resistance.

Examples of the carbon black include furnace black, acetylene black, ketjen black and thermal black.

Examples of the furnace black include SAF (Super Abrasion Furnace), ISAF (Intermediate Super Abrasion Furnace), IISAF-HS (Intermediate ISAF-High Structure), HAF (High Abrasion Furnace), FEF (Fast Extruding Furnace), GPF (General Purpose Furnace), and SRF (Semi-Reinforcing Furnace).

Examples of the thermal black include FT (Fine Thermal) and MT (Medium Thermal).

In terms of reinforcing properties and rubber extrudability, ISAF carbon black, HAF carbon black, FEF carbon black, GPF carbon black and SRF carbon black are preferred carbon blacks, with FEF carbon black, GPF carbon black and SRF carbon black being more preferred. These may be used singly or as combinations of two or more thereof.

The carbon black content is preferably 20 to 120 parts by weight and more preferably 40 to 80 parts by weight with respect to 100 parts by weight of the rubber component (A).

Various additives such as reinforcing agents, antioxidants, vulcanization activators, antiscorching agents, tackifiers, lubricants, dispersants, processing aids, and aids for vulcanization adhesion may be optionally blended in the rubber composition of the invention.

Although the method of producing the rubber composition of the invention is not particularly limited, the rubber composition of the invention can be obtained by a method which involves kneading the essential ingredients except the vulcanizing agent and vulcanization accelerator, and optional ingredients in a 3.4 L Banbury mixer for 5 minutes, taking out the mixture from the mixer at 160° C. to prepare a masterbatch, adding the vulcanizing agent and vulcanization accelerator to the masterbatch, and kneading the resulting mixture with an open roll.

This rubber composition can be further vulcanized under appropriate conditions to obtain the vulcanized rubber product of the invention.

The rubber composition of the invention includes the rubber component (A), the inorganic filler (B), the plasticizer (C) and the process oil (D) at the above-described specific ratio and has therefore oil resistance and weather resistance in a balanced manner while also exhibiting excellent adhesion to brass.

In cases where the content of the inorganic filler (B) is 50 parts by weight with respect to 100 parts by weight of the rubber component (A), the rubber composition of the invention also has excellent mechanical strength following vulcanization.

The rubber composition of the invention has the excellent properties as described above and can be therefore advantageously used as the rubber composition for hoses. The rubber composition of the invention may also be employed as the rubber material for vulcanization adhesion which is used to adhere together rubber materials of different polarities.

The rubber composition of the invention is useful as the rubber material for rubber/metal composite products which may be used in the fields requiring oil resistance and weather resistance. In particular, the rubber composition of the invention can be advantageously employed for the outer layer rubber in high-pressure hoses having a brass-plated, steel wire reinforced pressure-proof layer and for the intermediate rubber used between brass-plated, steel wire reinforced pressure-proof layers.

Next, the vulcanized rubber product of the invention is described.

The vulcanized rubber product of the invention is not particularly limited as long as it is obtained by vulcanizing the above-described rubber composition of the invention, and a preferable example thereof includes one having a rubber layer obtained by vulcanizing the rubber composition of the invention and a brass-plated reinforced layer adjoining to the rubber layer.

Specific examples of the vulcanized rubber product of the invention include hoses, conveyor belts, fenders, marine hoses and tires. Hoses are preferred and hydraulic hoses and high-pressure hoses as exemplified by steel wire reinforced hydraulic hoses for construction machines and hydraulic hoses for civil engineering works are more preferred.

A preferred embodiment of the hose of the invention is described below with reference to FIG. 1.

FIG. 1 is a cutaway perspective view of hose layers.

As shown in FIG. 1, a hose 1 has an inner rubber layer 2 as the inner tube, and a reinforced layer 3 formed on the inner rubber layer 2 and an outer rubber layer 4 as the outer tube.

Next, the rubber layers (inner rubber layer and outer rubber layer) and the reinforced layer making up the hose of the invention are described in detail.

Rubber Layers

The rubber layers are layers adjacent to the reinforced layer, and the hose of the invention has the inner rubber layer and the outer rubber layer as described above.

In the practice of the invention, at least one of the inner and outer rubber layers is formed using the rubber composition of the invention and, in terms of the weather resistance of the hose obtained, at least the outer rubber layer is preferably formed using the rubber composition of the invention.

The rubber composition for use in the inner rubber layer other than that of the invention may be appropriately selected and composed in terms of the oil resistance, chemical resistance and workability. Exemplary rubber materials include rubber compositions containing as their main ingredient at least one rubber selected from the group consisting of chlorine-free synthetic rubbers such as butyl copolymer rubbers, ethylene-propylene copolymer rubbers, EPDM, NBR, acrylic rubbers, hydrin rubbers, ethylene-acrylic acid ester copolymer rubbers (in particular AEM), and hydrogenated acrylonitrile-butadiene copolymer rubbers. In addition, mixtures with thermoplastic resins and thermoplastic elastomers may optionally be used.

The rubber composition of the invention is a preferred rubber composition that may be used in the inner rubber layer.

From the viewpoint that the hose obtained has excellent durability, the rubber composition used in the inner rubber layer preferably has a 100% modulus ($M_{100}$) following vulcanization of at least 4 MPa and more preferably 5 to 20 MPa.

As used herein, "100% modulus" refers to a value measured according to JIS K6251-2004.

The rubber composition of the invention is preferably used as the rubber composition for the outer rubber layer, but an appropriate rubber composition may be selected and composed in terms of the wear resistance and oil resistance.

Exemplary rubber materials that may be used in the other rubber composition than that of the invention include rubber compositions containing as their main ingredient at least one rubber selected from the group consisting of chlorine-free synthetic rubbers such as NBR, natural rubbers (NR), styrene-butadiene rubbers (SBR), butadiene rubbers (BR), EPDM, ethylene-acrylic acid ester copolymer rubbers (in particular AEM), hydrogenated NBR, and hydrin rubbers. In addition, mixtures with thermoplastic resins and thermoplastic elastomers may optionally be used.

From the viewpoint that the hose obtained has excellent durability, the rubber composition used in the outer rubber layer preferably has a 100% modulus ($M_{100}$) following vulcanization of at least 2 MPa and more preferably 3 to 15 MPa.

The rubber composition that may be used in the outer rubber layer is subjected to an Akron abrasion test (method A) according to JIS K6264-2-2005 under the conditions of a leaning angle between a specimen and a grinding wheel of 15°, a load applied to the grinding wheel of 27 N and a specimen rotational speed of 75±5 rpm, and preferably has a wear volume per 1000 revolutions of the grinding wheel of not more than 0.2 $cm^3$.

The rubber composition that may be used in the outer rubber layer preferably has a coefficient of expansion (VC) of not more than 100% as measured by the immersion test according to JIS K6258-2003 (immersion in IRM903 at 80° C. for 72 hours).

The inner rubber layer of the hose of the invention preferably has a thickness of 1.0 to 4.0 mm and more preferably 1.5 to 1.8 mm. The outer rubber layer preferably has a thickness of 0.5 to 2.5 mm and more preferably 0.8 to 1.5 mm.

Reinforced Layer

The reinforced layer is a layer provided outside the inner rubber layer in terms of holding strength. In the practice of the invention, the reinforced layer may be in the form of a blade or in a spiral form. The reinforced layer may be composed of two or more sublayers.

In the case of the reinforced layer having two or more sublayers, exemplary rubber compositions that may be used in the intermediate rubber layer between the reinforced sublayers include those containing as their main ingredient at least one rubber selected from the group consisting of chlorine-free synthetic rubbers such as NBR, NR, SBR, BR, EPDM, and ethylene-acrylic acid ester copolymer rubbers (in particular AEM). In addition, mixtures with thermoplastic resins and thermoplastic elastomers may optionally be used. The rubber composition of the invention is a preferred rubber composition that may be used in the intermediate rubber layer.

The rubber composition that may be used in the intermediate rubber layer preferably has a 100% modulus ($M_{100}$) following vulcanization of at least 2 MPa.

Exemplary materials that may be preferably used to form the reinforced layer include, but are not limited to, metallic materials such as hard steel wires (e.g., brass-plated wires and zinc-plated wires).

The reinforced layer is preferably brass-plated in terms of high adhesion to the rubber composition of the invention.

The method of manufacturing the hose of the invention including the rubber layers and the reinforced layer is not particularly limited but any conventionally known method may be used.

More specifically, an exemplary method that may be advantageously used includes a manufacturing method involving disposing the inner rubber layer, the reinforced layer and the outer rubber layer on a mandrel in this order and curing and adhering these layers by press vulcanization, steam vulcanization, oven vulcanization (hot air vulcanization) or hot water vulcanization under the conditions of 140 to 190° C. and 30 to 180 minutes.

The hose in another preferred embodiment of the invention includes an inner rubber layer, a first reinforced layer, an intermediate rubber layer, a second reinforced layer and an outer rubber layer disposed from inside in this order. It is particularly preferable for the outer rubber layer to be made of the rubber composition of the invention.

Even in the case of using, for the reinforced layers, a material having a brass-plated surface (such as brass-plated wire), the hose of the invention exhibits excellent adhesion between the rubber layers and the reinforced layers by forming the rubber layers using the rubber composition of the invention. Therefore, the hose of the invention has excellent durability. The hose of the invention also has excellent oil resistance and weather resistance.

EXAMPLES

Examples of the invention are given below by way of illustration, and not by way of limitation.

Examples 1 to 11 and Comparative Examples 1 to 11

The components shown in Table 1 were blended at a ratio (parts by weight) shown in Table 1 to prepare a rubber composition.

More specifically, the ingredients shown in Table 1 except sulfur and the vulcanization accelerator were first kneaded in a Banbury mixer (3.4 L) for 5 minutes and the kneaded mixture was taken out at 160° C. to prepare a masterbatch. Then, the sulfur and the vulcanization accelerator were added to the resulting masterbatch and the mixture was kneaded with an open roll to obtain a rubber composition.

For each rubber composition obtained, the physical properties following vulcanization were measured by the methods described below.

The results are shown in Table 1.

Tensile Strength

Each rubber composition was hot-pressed at 148° C. for 45 minutes to prepare a vulcanized sheet with a thickness of 2 mm, from which a JIS No. 3 dumbbell specimen was blanked.

The resulting specimen was subjected to a tensile test according to JIS K6251-2004 at room temperature (23° C.) at a tensile rate of 500 mm/min to measure the tensile strength.

Oil Resistance

Each rubber composition was vulcanized by hot pressing at 148° C. for 45 minutes to prepare a vulcanized sheet with a thickness of 2 mm, from which a strip specimen with a width of 20 mm, a length of 50 mm and a thickness of 2 mm was blanked.

The resulting specimen was immersed in a test oil (IRM903 available from Japan Sun Oil Co., Ltd.) having a temperature of 80° C. for 72 hours according to JIS K6258-2003 to measure the volume change rate ($\Delta V$) [%] following immersion.

The oil resistance is relatively good at a volume change rate of not more than 100%.

Weather Resistance

Each rubber composition was press-cured at 148° C. for 45 minutes to prepare a vulcanized sheet with a thickness of 2 mm, from which a strip specimen with a width of 10 mm, a length of 150 mm and a thickness of 2 mm was blanked.

According to JIS K6259-2004, the specimen was extended by 20% and exposed to an atmosphere with an ozone concentration of 100 pphm at 50° C. for 168 hours, and the state of the specimen was visually checked.

The specimen was rated as "good" when there was no abnormality such as cracking, and "NG" when there was an abnormality such as cracking.

Adhesion Properties (1) Peel Strength

Each rubber composition obtained was molded into a sheet with a thickness of 2.5 mm by a laboratory roll and the sheet was combined with a brass plate for pressure bonding. Cellophane paper was provided to the portion to be gripped with a chuck during peeling in order to avoid adhesion. Then, the combined sheet was press-cured at 148° C. for 60 minutes at a surface pressure of 3.0 MPa using a laboratory pressing machine to obtain a brass/rubber composite. This composite was allowed to stand at room temperature for 24 hours and cut into a width of 25 mm to obtain a specimen.

The resulting specimen was subjected to a peel test between the rubber composition and the brass plate according to JIS K6256-1999 "90 degree peel test of vulcanized rubber from metal piece" using a tensile tester according to JIS K6256 under the condition of a tensile rate of 50 mm/min to thereby measure the peel strength.

(2) Sticking of Rubber

A peel test was made as above to measure the percentage of rubber remaining stuck to the brass plate of the specimen following peeling according to JIS K6256-1999.

The adhesion is good at a peel strength value of at least 70 N/25 mm and a percentage of stuck rubber of at least 70%.

TABLE 1

|  | CE1 | EX1 | CE2 | EX2 | CE3 | EX3 | CE4 | EX4 | CE5 | EX5 | CE6 | CE7 |
|---|---|---|---|---|---|---|---|---|---|---|---|---|
| NBR1 | 25 | 30 | 50 | 40 | 70 | 60 | 60 | 40 | 25 | 30 | 15 | 40 |
| NBR2 |  |  |  |  |  |  |  |  |  |  |  |  |
| EPDM1 | 15 | 20 | 5 | 30 | 10 | 20 | 35 | 40 | 55 | 40 | 35 | 30 |
| EPDM2 |  |  |  |  |  |  |  |  |  |  |  |  |
| SBR1 | 60 | 50 | 45 | 30 | 20 | 20 | 5 | 20 | 20 | 30 | 50 | 30 |
| SBR2 |  |  |  |  |  |  |  |  |  |  |  |  |
| SBR3 |  |  |  |  |  |  |  |  |  |  |  |  |
| ISAF carbon black | 62 | 62 | 62 | 62 | 62 | 62 | 62 | 62 | 62 | 62 | 62 | 62 |
| HAF carbon black |  |  |  |  |  |  |  |  |  |  |  |  |

TABLE 1-continued

| | | | | | | | | | | | | |
|---|---|---|---|---|---|---|---|---|---|---|---|---|
| Inorganic filler | 15 | 15 | 15 | 15 | 15 | 15 | 15 | 15 | 15 | 15 | 15 | 15 |
| Zinc oxide | 5 | 5 | 5 | 5 | 5 | 5 | 5 | 5 | 5 | 5 | 5 | 5 |
| Stearic acid | 1 | 1 | 1 | 1 | 1 | 1 | 1 | 1 | 1 | 1 | 1 | 1 |
| Antiozonant | 2.4 | 2.4 | 2.4 | 2.4 | 2.4 | 2.4 | 2.4 | 2.4 | 2.4 | 2.4 | 2.4 | 2.4 |
| Plasticizer 1 | 6 | 7 | 11 | 10 | 15 | 13 | 13 | 9 | 6 | 7 | 3 | 0 |
| Plasticizer 2 | | | | | | | | | | | | |
| Process oil | 16 | 15 | 11 | 12 | 7 | 9 | 9 | 13 | 16 | 15 | 19 | 22 |
| Sulfur | 2 | 2 | 2 | 2 | 2 | 2 | 2 | 2 | 2 | 2 | 2 | 2 |
| Vulcanization accelerator 1 | 1.7 | 1.7 | 1.7 | 1.7 | 1.7 | 1.7 | 1.7 | 1.7 | 1.7 | 1.7 | 1.7 | 1.7 |
| Vulcanization accelerator 2 | | | | | | | | | | | | |
| Vulcanization accelerator 3 | | | | | | | | | | | | |
| Antiscorching agent | 0.3 | 0.3 | 0.3 | 0.3 | 0.3 | 0.3 | 0.3 | 0.3 | 0.3 | 0.3 | 0.3 | 0.3 |
| Tensile strength (MPa) | 16.9 | 16.1 | 17.5 | 15.1 | 16.6 | 15.1 | 13.1 | 14.3 | 15.1 | 14.6 | 15.9 | 16.2 |
| Oil resistance ΔV(%) | 87 | 81 | 51 | 73 | 31 | 49 | 57 | 82 | 110 | 96 | 110 | 75 |
| Weather resistance | NG | Good | NG | Good | NG | Good | Good | Good | Good | Good | Good | Good |
| Adhesion | | | | | | | | | | | | |
| Peel strength (N/25 mm) | 155 | 120 | 140 | 110 | 80 | 75 | 45 | 90 | 130 | 85 | 125 | 90 |
| Percentage of stuck rubber (%) | 100 | 100 | 100 | 100 | 20 | 80 | 5 | 70 | 80 | 75 | 100 | 40 |

| | CE8 | EX6 | EX7 | EX8 | CE9 | EX9 | CE10 | CE11 | EX10 | EX11 |
|---|---|---|---|---|---|---|---|---|---|---|
| NBR1 | | | 40 | 40 | 40 | 40 | 40 | 40 | 40 | 40 |
| NBR2 | 50 | 50 | | | | | | | | |
| EPDM1 | | | 30 | 30 | 30 | 30 | 30 | 30 | 30 | 30 |
| EPDM2 | 30 | 30 | | | | | | | | |
| SBR1 | | | 30 | 30 | | | 30 | 30 | 30 | 30 |
| SBR2 | 20 | 20 | | | | | | | | |
| SBR3 | | | | | 30 | 30 | | | | |
| ISAF carbon black | | | 62 | 62 | 62 | 62 | 62 | 62 | 62 | 62 |
| HAF carbon black | 60 | 60 | | | | | | | | |
| Inorganic filler | 0 | 15 | 50 | 75 | 2 | 5 | 15 | 15 | 15 | 15 |
| Zinc oxide | 5 | 5 | 5 | 5 | 5 | 5 | 5 | 5 | 5 | 5 |
| Stearic acid | 1 | 1 | 1 | 1 | 1 | 1 | 1 | 1 | 1 | 1 |
| Antiozonant | 2.4 | 2.4 | 2.4 | 2.4 | 2.4 | 2.4 | 2.4 | 2.4 | 2.4 | 2.4 |
| Plasticizer 1 | | | 10 | 10 | 10 | 10 | 3 | 17 | 14 | 8 |
| Plasticizer 2 | 10 | 10 | | | | | | | | |
| Process oil | 15 | 15 | 12 | 12 | 12 | 12 | 19 | 5 | 8 | 14 |
| Sulfur | 1.5 | 1.5 | 2.0 | 2.0 | 2.0 | 2.0 | 2.0 | 2.0 | 2.0 | 2.0 |
| Vulcanization accelerator 1 | | | 1.7 | 1.7 | 1.7 | 1.7 | 1.7 | 1.7 | 1.7 | 1.7 |
| Vulcanization accelerator 2 | 2.5 | 2.5 | | | | | | | | |
| Vulcanization accelerator 3 | 0.5 | 0.5 | | | | | | | | |
| Antiscorching agent | | | 0.3 | 0.3 | 0.3 | 0.3 | 0.3 | 0.3 | 0.3 | 0.3 |
| Tensile strength (MPa) | 14.5 | 14.8 | 12.6 | 10.5 | 13.0 | 13.1 | 13.9 | 15.8 | 16.9 | 16.5 |
| Oil resistance ΔV(%) | 52 | 51 | 64 | 60 | 69 | 69 | 78 | 65 | 68 | 70 |
| Weather resistance | Good | Good | Good | Good | Good | Good | Good | Good | Good | Good |
| Adhesion | | | | | | | | | | |
| Peel strength (N/25 mm) | 10 | 85 | 130 | 120 | 60 | 85 | 95 | 85 | 110 | 115 |
| Percentage of stuck rubber (%) | 0 | 75 | 100 | 100 | 10 | 85 | 45 | 40 | 95 | 95 |

The respective ingredients in Table 1 are as follows:

NBR1: Nancar 3345 available from NANTEX Industry Co., Ltd.; acrylonitrile content: 34 wt %; Mooney viscosity (ML1 + 4, 100° C.): 45

NBR2: JSR N220S available from JSR Corporation; acrylonitrile content: 41 wt %; Mooney viscosity (ML1 + 4, 100° C.): 56

EPDM1: EPT 4070 available from Mitsui Chemicals, Inc., ethylene content: 56 wt %, ethylidene norbornene content: 8 wt %, Mooney viscosity (ML1 + 4, 125° C.) 47

EPDM2: EPT65 available from JSR Corporation, ethylene content: 54 wt %, ethylidene norbornene content: 9 wt %, Mooney viscosity (ML1 + 4, 100° C.) 74

SBR1: Nipol 1502 available from Zeon Corporation; emulsion-polymerized SBR; bound styrene content: 23.5 wt %; Mooney viscosity (ML1 + 4, 100° C.) 52

SBR2: JSR 1500 available from JSR Corporation; emulsion-polymerized SBR; bound styrene content: 23.5 wt %; Mooney viscosity (ML1 + 4, 100° C.) 52

SBR3: Tufdene 2000R available from Asahi Kasei Chemicals Corporation; solution-polymerized SBR; bound styrene content: 25 wt %; Mooney viscosity (ML1 + 4, 100° C.) 45

ISAF carbon black: SHOBLACK N220 available from Showa Cabot K.K.

HAF carbon black: DIABLACK HA available from Mitsubishi Chemical Corporation

Inorganic filler (hard clay): Suprex Clay available from Kentucky-Tennessee Clay Co.

Zinc oxide: 3 grade available from Seidou Kagaku Kogyo KK

Stearic acid: available from NOF Corporation

Antiozonant: OZONONE 6C available from Seiko Chemical Co., Ltd.

Plasticizer 1 (triisononyl trimellitate): ADK CIZER C-9N available from ADEKA Corporation Plasticizer 2 (dioctyl phthalate): available from Mitsubishi Chemical Corporation Process oil (aromatic oil): A-OMIX available from Sankyo Yuka Kogyo K.K.

Sulfur: available from Hosoi Kagaku Kogyo K.K.

Vulcanization accelerator 1 (N-t-butylbenzothiazole-2-sulfenamide): NOCCELER NS-P available from Ouchi Shinko Chemical Industrial Co., Ltd.

Vulcanization accelerator 2 (N-cyclohexylbenzothiazole-2-sulfenamide): NOCCELER NS-CMPO available from Ouchi Shinko Chemical Industrial Co., Ltd.

Vulcanization accelerator 3 (tetramethylthiuram disulfide: NOCCELER TT-PO available from Ouchi Shinko Chemical Industrial Co., Ltd.

Antiscorching agent: N-cyclohexylthiophthalimide available from FLEXSYS

As is clear from the results shown in Table 1, the rubber compositions (in Comparative Examples 1 to 6) in which the ratio of at least one of NBR, EPDM and SBR was outside the range of the invention were inferior in any of oil resistance, weather resistance and adhesion.

The rubber compositions (in Comparative Examples 8 and 9) in which no inorganic filler was included or its content was outside the range of the invention had poor adhesion.

The rubber compositions in which the weight ratio of the plasticizer to the process oil was outside the range of the invention had poor adhesion.

On the other hand, the rubber compositions in Examples 1 to 11 were excellent in oil resistance, weather resistance and adhesion to brass. In addition, the rubber compositions in Examples 1 to 8 and 10 to 11 also had a good mechanical strength following vulcanization.

Examples 12 to 13 and Comparative Example 12

The respective rubber compositions obtained as described above were used to manufacture high-pressure hoses.

The rubber composition indicated in the column of inner rubber layer in Table 2 was extruded onto a mandrel with an external diameter of 12.5 mm to which a release agent had been applied in advance to form an inner tube with a thickness of 2 mm. A brass-plated wire (with a wire diameter of 0.3 mm) was braided outside the inner tube and the rubber composition indicated in the column of outside rubber layer in Table 2 was extruded outside the brass-plated wire to form an outer rubber layer with a thickness of 2 mm. Then, these layers were vulcanized by heating at 150° C. for 60 minutes, after which the mandrel was pulled out to obtain a high-pressure hose.

The respective high-pressure hoses obtained were subjected to the following tests.

The results are shown in Table 2.

Hose Impulse Test

The resulting high-pressure hose was subjected to a hose impulse test in which a pressure of 20.5 MPa was repeatedly applied at 100° C. with a period of 1 Hz to thereby evaluate the durability. A hose operating 500,000 times or more in the hose impulse test was rated as "good" because of its excellent durability, whereas a hose operating less than 500,000 times was rated as "NG" because of poor durability.

Oil Resistance Test

Grease was applied to the outer rubber layer of the hose, which was then allowed to stand in an oven having a temperature of 100° C. for 48 hours. Thereafter, the hose was rated as "good" when there was no abnormality such as a slit, "NG" when there was an abnormality such as a slit.

Weather Resistance Test

The hose was fixed at a bend radius of 80 mm and exposed to an atmosphere with an ozone concentration of 100 pphm at 50° C. for 168 hours, and the state of the hose was visually checked. The hose was rated as "good" when there was no abnormality such as cracking, and "NG" when there was an abnormality such as cracking.

TABLE 2

|  | Example 12 | Example 13 | Comparative Example 12 |
|---|---|---|---|
| Inner rubber layer | Example 1 | Comparative Example 1 | Comparative Example 4 |
| Outer rubber layer | Example 1 | Comparative Example 1 | Comparative Example 4 |

TABLE 2-continued

|  | Example 12 | Example 13 | Comparative Example 12 |
|---|---|---|---|
| Hose impulse test | Good | Good | NG |
| Oil resistance | Good | Good | Good |
| Weather resistance | Good | Good | Good |

As is clear from the results shown in Table 2, the hose (in Comparative Example 12) in which the rubber composition (in Comparative Example 4) containing SBR in a smaller amount than the range of the invention was used for the inner rubber layer and the outer rubber layer was excellent in oil resistance and weather resistance but had low durability.

On the other hand, the hoses (in Examples 12 and 13) in which the rubber composition of the invention was used for at least the outer rubber layer were excellent in all of durability, oil resistance, and weather resistance.

What is claimed is:

1. A vulcanizing rubber product comprising: a rubber layer obtained by vulcanizing a rubber composition comprising a rubber component (A), an inorganic filler (B), a plasticizer (C), and a process oil (D); and a brass-plated reinforced layer adjoining to the rubber layer, wherein
    the rubber component (A) contains 30 to 50 wt % of an acrylonitrile-butadiene rubber, 20 to 35 wt % of an ethylene-propylene-nonconjugated diene rubber, and 25 to 50 wt % of a styrene-butadiene rubber,
    the inorganic filler (B) is clay,
    the content of the inorganic filler (B) is 10 to 100 parts by weight with respect to 100 parts by weight of the rubber component (A), and
    the weight ratio of the plasticizer (C) to the process oil (D) is 15/85 to 75/25.

2. The vulcanized rubber product of claim 1 which is a hose.

3. The vulcanized rubber product of claim 1 which is a hydraulic hose or a high-pressure hose.

4. A hose comprising an inner rubber layer, a brass-plated reinforced layer disposed so as to adjoin to a circumferential side of the inner rubber layer, and an outer rubber layer disposed so as to adjoin a circumferential side of the reinforced layer, wherein
    at least the outer rubber layer is formed from a rubber composition comprising a rubber component (A), an inorganic filler (B), a plasticizer (C), and a process oil (D),
    the rubber component (A) contains 30 to 50 wt % of an acrylonitrile-butadiene rubber, 20 to 35 wt % of an ethylene-propylene-nonconjugated diene rubber, and 25 to 50 wt % of a styrene-butadiene rubber,
    the inorganic filler (B) is clay,
    the content of the inorganic filler (B) is 10 to 100 parts by weight with respect to 100 parts by weight of the rubber component (A), and
    the weight ratio of the plasticizer (C) to the process oil (D) is 15/85 to 75/25.

5. The vulcanized rubber product of claim 2 which is a hydraulic hose or a high-pressure hose.

* * * * *